No. 823,425. PATENTED JUNE 12, 1906.
J. W. MARLER.
HUB ATTACHING DEVICE.
APPLICATION FILED NOV. 9, 1905.

Witnesses
Geo. Hilton
C. H. Griestauer

Inventor
James W. Marler,
by H. B. Wilson
Attorney

UNITED STATES PATENT OFFICE.

JAMES W. MARLER, OF EAST BEND, NORTH CAROLINA.

HUB-ATTACHING DEVICE.

No. 823,425.    Specification of Letters Patent.    Patented June 12, 1906.

Application filed November 9, 1905. Serial No. 286,625.

*To all whom it may concern:*

Be it known that I, JAMES W. MARLER, a citizen of the United States, residing at East Bend, in the county of Yadkin and State of North Carolina, have invented certain new and useful Improvements in Hub-Attaching Devices; and I do declare the following to be a full, clear, and exact description of the invention, such as will enable others skilled in the art to which it appertains to make and use the same.

My invention relates to improvements in devices for attaching the hubs of vehicle-wheels to their spindles without the use of nuts.

The object of the invention is to provide a simple, durable, and inexpensive device of this character by means of which the wheel-hub may be quickly and easily locked to its spindle or removed therefrom for cleaning and lubricating purposes.

With the above and other objects in view the invention consists of certain novel features of construction, combination, and arrangement of parts, as will be hereinafter described and claimed.

Figure 1:
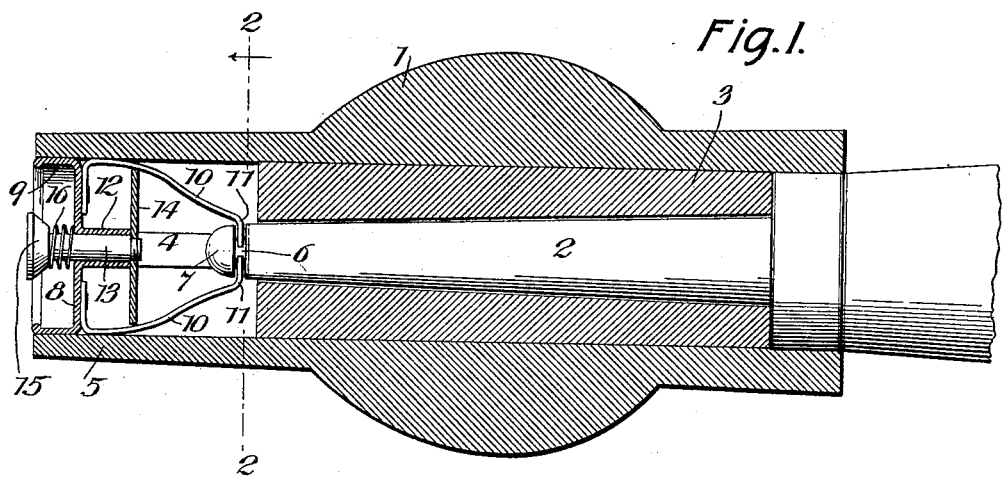
Figure 2:
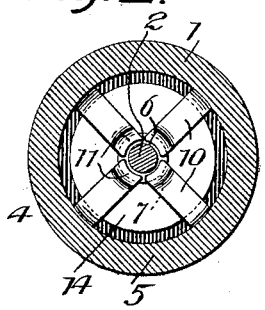
Figure 3:
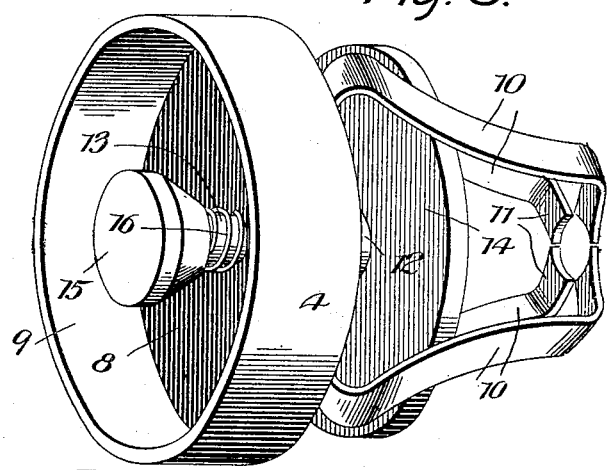

In the accompanying drawings, Figure 1 is a sectional view through a vehicle-hub, showing my improved device for securing it to its spindle. Fig. 2 is a vertical transverse sectional view taken on the line 2 2 in Fig. 1. Fig. 3 is a perspective view of the device removed from the spindle and hub, and Fig. 4 is a detail sectional view through a slightly-modified form of the invention.

Referring to the drawings by numerals, 1 denotes the hub of a vehicle-wheel of any description, and 2 denotes an axle-spindle which projects into the boxing 3 of said hub. My improved attaching device 4 is adapted to fit snugly into the projecting outer end 5 of the hub 1 and to engage an annular groove or recess 6, formed in the spindle 2 adjacent to its outer end. This annular groove 6 is engaged by a plurality of spring-arms which are carried by the device 4, and in order to facilitate their engagement with said groove the end 7 of the spindle is tapered or rounded, as shown. The device 4 comprises a cap or circular plate 8, which is adapted to fit snugly within the end 5 of the hub and is preferably formed with an annular flange 9 to engage the interior of the hub, as shown. Riveted or otherwise secured upon the inner face of the cap 8 is a plurality of spring-arms 10, which are slightly bent or curved, as shown, so that they converge inwardly, and which have their ends 11 bent and shaped to form jaws which enter the groove 6 in the spindle. While any number of these arms 10 may be employed, I preferably provide four and arrange them equidistant apart, as shown. It will be seen that by simply pushing the cap into the end 5 of the hub the tapered end 7 of the spindle will enter between the ends or jaws 11 of the arms, force them apart, and permit them to spring into the groove 6 to lock the hub upon the spindle. In order to permit the ends or jaws 11 to be disengaged from said grooves, so that the device and the hub may be removed from the spindle, I provide in a tubular guide 12 upon the inner face of the cap 8 a sliding rod 13, which has upon its inner end a circular head or disk 14. The latter is of such size that when it is engaged with the end of the guide 12 it is out of contact with the spring-arms 10 and that when it is moved inwardly by pressing upon the outer end of the rod 13 it will engage the inner faces of the curved portions of the arm and force the latter outwardly or apart to permit the end 7 of the spindle to pass between the jaws 11. The outer end of the rod 13, which projects through a centrally-arranged opening in the cap 8, has secured upon it a knob or finger-piece 15. Coiled around this outer portion of the rod 13 is a coil-spring 16, which is confined between the cap 8 and the knob 15 and which exerts its energy to retract the head 14, so that the spring-arms 10 are normally in their closed position. It will be seen that by simply pressing inwardly upon the knob 15 and disengaging the ends of jaws 11 from the groove 6 in the spring-arm the device 4 may be quickly removed from the hub.

Figure 4:
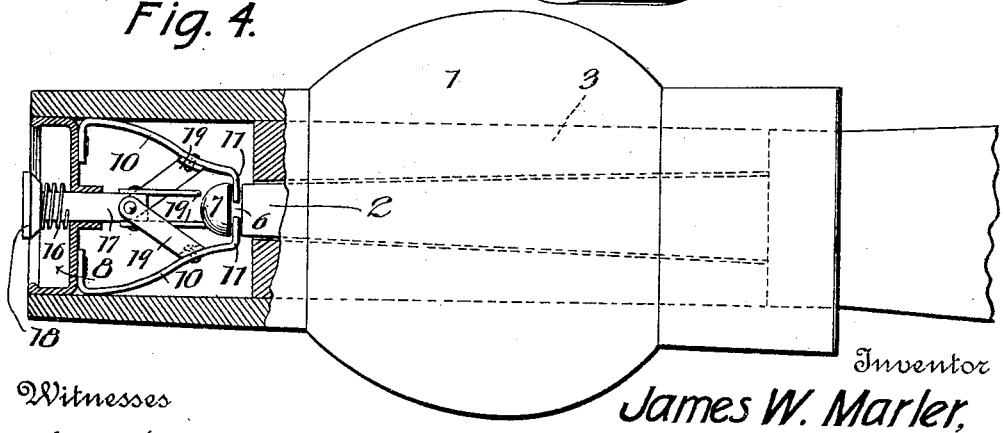

If desired, I may employ the releasing device shown in Fig. 4 of the drawings for the purpose of disengaging the spring-arms from the groove in the spindle. This releasing device comprises a sliding rod 17, which extends centrally through the cap 8 and has upon its outer end a knob or finger-piece 18. To its inner end are pivotally connected the outer ends of a series of links 19, which have their inner ends loosely connected to the spring-arms 10. It will be seen that when the button 18 is moved inwardly the links 19 will force the spring-arms apart to permit the end 7 of the spindle to pass between the jaws 11 and that when said button is released the resiliency of the arms 10 will return the parts to their normal position. (Shown in Fig. 4.)

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A wheel-retainer having a cap for attachment to a wheel-hub, inwardly-extending converging spring-arms attached to said cap and having their inner ends inturned to engage an annular groove in an axle-spindle, a longitudinally-movable rod carried and guided by said cap, and means operated by said rod to spread the inner ends of said spring-arms apart and disengage them from the axle-spindle, substantially as described.

2. A wheel-retainer having a cap for attachment to a wheel-hub, inwardly-extending converging spring-arms attached to said cap and having their inner ends inturned to engage an annular groove in an axle-spindle, a longitudinally-movable rod carried and guided by said cap, means operated by said rod to spread the inner ends of said spring-arms apart and disengage them from the axle-spindle, and a spring to move said rod outwardly to normally permit said arms to engage the groove in the axle-spindle, substantially as described.

3. A wheel-retainer having a cap for attachment to a wheel-hub, inwardly-extending converging spring-arms attached to said cap and having their inner ends inturned to engage an annular groove in an axle-spindle, a longitudinally-movable rod carried and guided by said cap, and a head operated by said rod to spread the inner ends of said spring-arms apart and disengage them from the axle-spindle, substantially as described.

In testimony whereof I have hereunto set my hand in presence of two subscribing witnesses.

JAMES W. MARLER.

Witnesses:
J. M. WHITTINGTON,
J. LEE NORMAN.